Patented July 11, 1933

1,918,038

UNITED STATES PATENT OFFICE

ALPHONS O. JAEGER, OF MOUNT LEBANON, PENNSYLVANIA, ASSIGNOR TO THE SELDEN COMPANY, OF PITTSBURGH, PENNSYLVANIA, A CORPORATION OF DELAWARE

CATALYTIC OXIDATION OF AMMONIA

No Drawing. Application filed April 14, 1928, Serial No. 270,163. Renewed May 26, 1930.

This invention relates to the catalytic purification and oxidation of ammonia to oxides of nitrogen.

In the past, ammonia has been oxidized to oxides of nitrogen at elevated temperatures by means of air or other oxidizing gases in the presence of contact masses, usually platinum gauze. The present invention is directed to the production of oxides of nitrogen by this method using either pure ammonia, such as has been used in the past or impure ammonia containing organic impurities or impurities containing sulfur, either inorganic, such as hydrogen sulfide, or organic. The chief source of such impure ammonia in this country is the ammoniacal liquor obtained in the distillation of coal and other nitrogen containing carbonaceous material, and while the present invention is by no means limited to the utilization of material from such sources it is a marked advantage that by means of the catalysts and processes that form its subject matter such raw materials may be utilized. By means of the proper use of these catalysts, and by the proper selection of reaction temperatures, the impurities in the ammonia obtained from such sources can be readily oxidized to undesired or relatively harmless substances and the ammonia itself either simultaneously or subsequently oxidized to oxides of nitrogen.

The preferred contact masses described in the present invention contain non-silicious base exchange bodies, that is to say complex compounds which are able to exchange certain of their bases for other bases from salt solutions, the process being reversible. The products are analogous to the silicon containing base exchange bodies, the zeolites, and share the advantageous physical properties possessed by these substances but do not contain any silicon present in the non-exchangeable nucleus.

The non-silicious base exchange bodies used in making catalytic compositions of the present invention may or may not possess high base exchanging power since the catalytic value of the final compositions is not solely dependent on the amount of base exchanging power present. It should be understood, however, that the term "base exchange body" as used in the present invention includes only such bodies which when freshly prepared possess some base exchange power.

The non-silicious base exchange bodies which are used in the contact masses of the present invention may be diluted or undiluted, but diluted products in which the diluents are associated with the base exchange body in the form of a physically homogeneous structure in which they share the advantageous structure of the base exchange bodies may be considered as the preferred forms of contact masses for use in the present invention. The invention, however, is not limited to the use of diluted products and many valuable contact masses can be prepared with undiluted base exchange bodies and are included in the invention.

Catalytically active components may be associated with diluted or undiluted non-silicious base exchange bodies in four main forms:—(1) They may be physically admixed with or impregnated into the non-silicious base exchange products. (2) They may be physically homogeneously incorporated into the non-silicious base exchange products before the latter have been completely formed in the form of catalytically active diluent bodies or in the form of diluents which have been impregnated with catalytically active substances. (3) They may be chemically combined with or in the non-silicious base exchange products in non-exchangeable form, that is to say they may form a part of the non-exchangeable nucleus of the non-silicious base exchange body present in the final contact mass. (4) They may be chemically combined in exchangeable form either during the formation of the non-silicious base exchange body or by base exchange after formation. Obviously of course the same or different catalytically active components may be present in more than one of the above described forms, and it is an advantage of the present invention that catalytically active substances may be introduced in a wide variety of forms which gives a large field of choice to the catalytic chemist.

While the different non-silicious base exchange products may vary widely in their chemical characteristics, they all possess a similar physical structure which is characterized by more or less high porosity, frequency microporosity, and great resistance to high temperatures.

While three of the methods of combination of the catalytically active substances may be effected with undiluted as well as diluted non-silicious base exchange products, it has been found that homogeneously diluted non-silicious base exchange contact masses are of advantage, particularly where the diluents are of a physical nature such as to exert a desired influence on the contact masses, as when, for example, the diluents by reason of high porosity, capillarity, or surface energy may be considered as physical catalysts or activators.

Non-silicious base exchange bodies used in contact masses of the present invention behave as if they were products of extremely high molecular weight for catalytically active components can be introduced either into the non-exchangeable nucleus or in the form of exchangeable bases in practically any desired proportions and the ordinary law of chemical combining proportions, which in compounds of low molecular weight restricts the proportions in which components can be incorporated chemically, appears to be without force, which makes it reasonable to assume that the molecular weight is so high as to completely mask the effect of the law. It is of course possible that the non-silicious base exchange bodies, or some of them, may be solid solutions of a plurality of related compounds of lower molecular weight. It has not been possible hitherto to definitely settle this question, as non-silicious base exchange bodies are not readily capable of structural chemical analysis. The present invention is of course not limited to any theory, but irrespective of the underlying reasons the fact that catalytically active components may be chemically introduced in any desired proportions is of enormous importance to the catalytic chemist and gives him the power to produce an almost unlimited number of finely and gradually toned catalysts or contact masses for the catalytic oxidation of ammonia and in all cases the contact masses produced are highly effective by reason of the desirable physical structure of the non-silicious base exchange products contained therein and the wide limits of homogeneous dilution of catalytically active molecules or atoms with resulting uniformity and smoothness of action.

Another important advantage of contact masses containing non-silicious base exchange bodies or their derivatives lies in the fact that these contact masses are extremely resistant to the high temperatures which obtain in the oxidation of ammonia, temperatures which may range from 500–800° C. or in some cases even higher. It should be understood that while non-silicious base exchange bodies share to a greater or less degree many of the desirable physical properties of their silicon-containing analogues, the zeolites, such as, for example high porosity and in some cases opalescent structure, they are quite different chemically and the combination of elements entering into their nucleus is, of course, different.

In addition to the important characteristics with which non-silicious base exchange bodies endow the contact masses of the present invention, it has been found that in many cases it is desirable to stabilize the contact masses and this may be effected by associating with the non-silicious base exchange bodies or incorporating or forming therein compounds of the alkali-forming metals, that is to say the alkali metals, the alkaline earth metals and the strongly basic earth metals. These compounds appear to slow up or smooth out the catalytic reaction and will be referred to throughout the specification and claims as stabilizers. The stabilizers may be non-alkaline, weakly alkaline or strongly alkaline depending on the nature of the contact mass desired and on the reaction conditions under which it is to be used. It is an important advantage of the present invention that in the formation of most non-silicious base exchange bodies alkali-forming metal oxides are present as exchangeable bases and whether the contact masses are used with or without acid treatment or are leached with acid they form stabilizers which are combined in or associated with the resulting non-silicious base exchange bodies in an extremely fine state of division in which the activity of the stabilizers is peculiarly effective. Thus, non-silicious base exchange bodies containing alkali forming exchangeable bases may be considered as complex stabilizers.

In addition to the use of stabilizers, which are important in connection with many of the contact masses used in the present invention, it has been found that the stabilizer action and the overall efficiency of the contact masses can in many cases be greatly increased or enhanced by the association therewith or chemical combination therein of elements or radicals or groups which are catalytically active but which do not possess specific catalytic activity for the oxidation of ammonia to oxides of nitrogen. Thus, for example, it will be noted that the reaction involves the production and splitting off of water. For this reason it is desirable in many of the contact mass compositions of the present invention to incorporate or include catalysts or catalytic components which are not specific catalysts for the oxidation of ammonia to the oxides of nitrogen but which may favor dehydration. In other cases different non-specific catalysts may be used and are of importance. Thus, for example, when coal tar ammonia is being oxidized, it is necessary to burn out the organic impurities present and while some catalytic components which are oxidizers of ammonia to oxides of nitrogen also favor the selective catalytic combustion of organic impurities in other contact masses, components may be incorporated which favor the selective catalytic combustion of organic impurities or their transformation into compounds which are harmless or easily separated from the final product may not be specific catalysts for the oxidation of ammonia to oxides of nitrogen, at least under the reaction temperature used. In this connection it should be noted that the effectiveness of different catalytic components will vary with the temperature at which the reaction takes place and that at one temperature a component may be a specific catalyst whereas at another temperature, frequently a lower reaction temperature, the particular component may no longer be a specific catalyst. These non-specific catalysts will be referred to throughout the specification and claims as stabilizer promoters and the expression is intended to have no other meaning. The concept of stabilizer promoters is therefore not intended to define the chemical individuals or groups but is relative and refers to the action of the catalytic groups under the reaction conditions obtaining. The use of the expression stabilizer promoter should in no sense be taken to limit the invention to a particular theory of action and these non-specific catalysts, and in fact in some cases stabilizer promoters, may be present where there are no stabilizers.

The tremendous range of chemical groups which may be combined in or with or incorporated in non-silicious base exchange bodies permits a wide choice of stabilizer promoters as well as specific catalysts and permits their association with the contact masses in an extremely homogeneous and catalytically efficient form. Thus, many non-silicious base exchange bodies may be considered as combined catalysts, stabilizers, and stabilizer promoters as all of these elements may be present in the same chemical compound and sharing the advantages flowing from its desirable physical structure and chemical properties. Of course, both stabilizer and stabilizer promoters may be mixed partly or wholly with the non-silicious base exchange bodies and a single stabilizer or single stabilizer promoter may be present partly in physical admixture and partly in chemical combination as will be clear to the skilled base exchange chemist.

The method of preparation of the non-silicious base exchange bodies and the incorporation thereinto of suitable catalysts, stabilizers, stabilizer promoters and diluents is described in detail in my prior Patent No. 1,694,620, dated December 11, 1928, of which this is a continuation in part, and need not be repeated. It is sufficient to state here that the method of adding the more acid component solutions to the more alkaline components recommended in that case as being generally preferable is also the preferred method in the production of catalysts for the purification and oxidation of ammonia, although the converse procedure may also be employed in some cases and may result in many valuable contact masses used in the present invention.

While, as has been stated above, the present invention includes ammonia oxidation processes in which either diluted or undiluted non-silicious base exchange bodies are used as contact masses, it is preferable in most cases to utilize diluted non-silicious base exchange bodies in the contact masses and it is desirable although not essential that the diluents be homogeneously incorporated in or with the non-silicious base exchange body before formation of the latter or at least before the product has set after formation. Many diluents, both inert, stabilizing, activating, catalytically active, or having stabilizer promoter effects, can be used. A few of the diluents will be briefly enumerated: natural or artificial powders of rocks, stones, tuffs, trass, lava, and similarly volcanic products which are frequently highly porous, greensand, pulverized slag wool, cements, sand, pulverized earthenware, fuller's earth, talc, glass powder, pumice meal, asbestos, graphite, activated carbon, quartz meal, various pulverized minerals rich in quartz, metal powders and metal alloy powders, salts of oxymetal acids such as tungstates, vanadates, chromates, uranates, manganates, cerates, molybdates, etc., particularly iron, silver, thorium, copper salts of the above, silicates, such as copper silicate, iron silicate, nickel silicate, cobalt silicate, aluminum silicate, titanium silicate, zircon, minerals or ores, especially those rich in copper, and iron etc. Finely divided diluents are of great advantage, especially when the average particle size is less than 60 microns, in which case the diluents possess high surface energy, which increases the adsorptive and absorptive capacity of the contact mass, the diffusion speed and porosity. These finely divided diluents may be considered as physical catalysts or activators. Diluted or undiluted non-silicious base exchange bodies or their derivatives, silicious or non-silicious, may be finely divided and used as part or all of the diluents of the non-silicious base exchange bodies used in the contact masses of the present invention.

The method of introducing diluents and the various possibilities of combination are described in connection with zeolites which, although chemically different from the products of the present invention, are formed in a somewhat similar matter and are described in detail in the co-pending application of Jaeger and Bertsch, Serial No. 95,771, filed March 18, 1926, and will not be described in detail in the present application, except in the specific examples which follow and which illustrate a few typical products.

The nucleus of the non-silicious base exchange body may be considered as containing two different classes of components, namely, relatively alkaline oxides and relatively acid oxides. Normally, where the reaction is between metallates and metal salts, the metal oxides present in the metallates are more acid, and usually amphoteric, than those present in the metal salts. It should be carefully borne in mind, of course, that the nucleus of the non-silicious base exchange body behaves as a single acid radical and can not be split by ordinary chemical means without foregoing decomposition and it is merely a matter of convenience to consider the nucleus as containing two different types of oxides.

The metal compounds which are capable of forming the basic portion of the nucleus are those of the following metals:—copper, silver, gold, bismuth, beryllium, zinc, cadmium, boron, aluminum, titanium, zirconium, tin, lead, thorium, niobium, antimony, tantalum, chromium, molybdenum, tungsten, uranium, vanadium, manganese, iron, nickel, cobalt, platinum, palladium. Compounds of these elements may be introduced singly or in mixtures, in any desired proportions, and may be in the form of simple or complex ions. It should be understood that some of the elements in certain stages of oxidation may be introduced either as metallates or metal salts. Others may be introduced in only one form, and still others may be introduced in a stage of oxidation other than that desired in the final base exchange body or in the form of complex compounds. Among the complex ionogens are ammonia, hydrocyanic acid, oxalic acid, formic acid, tartaric acid, citric acid, glycerine and the like.

Examples of the components forming the relatively acid portion of the base exchange nucleus are metallates containing vanadium, tungsten, chromium, titanium, uranium, antimony, manganese, etc. and in some cases the alkali metal salts of metalloids, such as boron phosphorus and nitrogen may also be used. Many of the metals are specific catalysts for the oxidation of ammonia, others are stabilizers and still others are stabilizer promoters. The status of an element as catalyst or stabilizer promoter may vary with the particular reaction conditions and with the nature of the contact mass.

The exchangeable bases of the non-silicious base exchange bodies may be substituted by base exchange, and the elements which can be introduced singly or in admixture by base exchange are the following:—copper, silver, gold, ammonium, beryllium, calcium, manganese, zinc, strontium, cadmium, barium, lead, aluminum, titanium zirconium tin, antimony, thorium, vanadium, thallium, bismuth, chromium, uranium, manganese, iron, cobalt, nickel, palladium, platinum, and cerium.

The exchangeable bases introduced may be specific catalysts, they may be stabilizers, or they may be stabilizer promoters. They may be introduced as simple ions or as complex ions and may enhance the catalytic activity of the final contact mass, improve its physical strength, or both.

Non-silicious base exchange bodies may also be coated in the form of films on massive carrier granules or may be impregnated therein. The massive carriers may be inert, activating, or themselves catalysts.

The present invention may be carried out as a single catalytic reaction, namely, the oxidation of ammonia to oxides of nitrogen, and where a pure ammonia, such as, for example, ammonia catalytically synthesized from its elements, is used this will be the normal reaction. It is, however, an advantage of the present invention that effective composite contact masses may be used and impure ammonia can be oxidized with concomitant selective transformation of impurities into easily separable or unobjectionable products. Thus, for example, ammonia produced as a by-product from the distillation of coal, wood, and other products is normally contaminated with considerable amounts of organic impurities or impurities containing sulfur, either inorganic, such as hydrogen sulfide, or organic. It is quite common for such by-product ammonia to contain considerable amounts of phenols. When such an impure ammonia is passed over a suitable contact mass containing a non-silicious base exchange body the organic and other impurities are oxidized to easily separable or harmless products and at the same time the ammonia is oxidized to oxides of nitrogen. Naturally, of course, the reaction may or may not be absolutely simultaneous and there is reason to believe that with composite contact masses a selective oxidation of impurities takes place before the ammonia is oxidized. In some modifications of the present invention it is also desirable to arrange the catalyst in zones, for example, permitting gases first to encounter the contact masses which favor the selective oxidation of impurities and then to encounter a contact mass which permits the oxidation of ammonia to oxides of nitrogen. The zones may be separate or contiguous.

The present invention is not concerned with a particular temperature and the temperature ranges which have been used with other contact masses and which normally run from 500–800° C. may be employed and the optimum temperature will, of course, depend on the precise nature of the contact mass utilized. The proportions of reacting ingredients may also vary and the reaction may be carried out at atmospheric pressure or at pressures above or below atmosphere. A few representative processes coming within the scope of the present invention will be set forth in greater detail in the following specific examples, it being clearly understood that the invention is not limited thereto.

Example 1

(1) 50 parts of freshly precipitated iron oxide are prepared by adding 5–6% ammonia to a 10–15% ferrous nitrate solution at 40–50° C. until the reaction is ammoniacal. The finely divided iron oxide is washed with distilled water to remove the ammonium nitrate and dried at temperatures below 100° C.

(2) 24 parts of lead dioxide in the form of sodium plumbite are dissolved in water to form a 5% solution.

(3) 5 parts of aluminum oxide in the form of a freshly precipitated hydroxide are dissolved in a 2N potassium hydroxide solution to form the corresponding potassium aluminate.

(4) 18 parts of thorium nitrate containing 12 mols of water are dissolved in 100 parts of water.

(5) 25 parts of copper nitrate containing 3 mols of water are dissolved in 100 parts of water.

The freshly precipitated iron oxide is added to a mixture of the plumbite and aluminate solutions and thereupon the thorium nitrate and copper nitrate solutions, which have been mixed together, are added. The reaction product obtained is thoroughly pressed and dried at 80–90° C. and then broken into fragments. The product is a non-silicious base exchange body containing aluminum, lead, thorium and copper in non-exchangeable form and iron oxide in the form of a diluent. The contact mass is filled into a suitable converter and a mixture of ammonia and air containing 7–9% by volume of ammonia is passed over the contact mass at 600–800° C., resulting in good yields of nitrogen oxides. The base exchange body, containing iron oxide, may be considered both as an adhesive and as a stabilizer promotor which enhances the catalytic activity of the iron oxide.

Effective modified contact masses may be prepared by replacing the exchangeable alkali by means of magnesium oxide, calcium oxide, copper oxide, cerium dioxide or cobalt oxide, singly or in admixture, the base exchange being effected by trickling 5–10% solutions of the corresponding salts over the contact mass. The modified contact mass may be used for the oxidation of ammonia admixed with air to form a 7–9% mixture, the temperature preferably being 650–750° C. High yields of nitrogen oxides are obtained.

Other modified contact masses may be obtained by using different component solutions, for example the aluminate and plumbite solutions may be partly or entirely replaced by corresponding amounts of other metallates such as, for example, chromites. Similarly the thorium and copper salt solutions may be partly or wholly replaced by solutions containing one or more salts of manganese zirconium, nickel, cobalt, chromium, cerium, titanium or cadmium.

Other modified contact masses may be obtained by varying the proportions of the component solutions, but when the proportions are varied care should be taken that after the reaction is completed the base exchange bodies remain strongly alkaline to litmus and preferably neutral or alkaline to phenolphthalein.

The components used in forming the non-silicious base exchange bodies may be catalytically active or activating, or they may possess the character of stabilizer promoters. In all cases they are combined in the non-exchangeable nucelus of the complex base exchange molecule in a form in which their efficiency for the catalysis is very high.

The exchangeable alkali of the base exchange body may also be replaced to a certain extent by other metal oxides, which may be catalysts, stabilizers or stabilizer promoters. The introduction may be effected in the usual manner by trickling 3–5% solutions of the corresponding metal salts over the base exchange body, preferably at a somewhat elevated temperature, for example between 40 and 60° C., or, if preferred, the base exchange body may be suspended in the salt solution. The salts may be those of calcium, magnesium, barium, silver, copper, zinc, chromium, cobalt, manganese, thorium, cerium or lead, and one or more such salts may be used. The contact masses in which a maximum of alkali is replaced by one or more of the above referred to metals or by ammonia, when the corresponding ammonium salt solutions are permitted to trickle over the contact masses are in general well toned and active and do not tend to produce any appreciable decomposition of ammonia or nitrogen oxides to elementary nitrogen.

In this example diluent bodies are embedded in the base exchange bodies by the preferred method, that is to say they are formed in situ, but undiluted base exchange bodies may also be used effectively for the oxidation of ammonia. For economical production of contact masses, however, it is advantageous to embed diluents therein. Particularly desirable diluents are those containing oxides of the metals of the iron group with or without smaller amounts of rare earth metal oxides. By the proper choice of the component solutions used in forming the contact masses it is possible to obtain products having a very great resistance to the high temperatures which are encountered in the reaction.

*Example 2*

(1) A 10% sodium aluminate solution is prepared containing 20 parts of $Al_2O_3$.

(2) 10 parts of basic copper carbonate are dissolved in 5% ammonia water to form the corresponding cuprammonium compound.

(3) A 10% solution is prepared containing a mixture of chromium and iron nitrate in which the proportion of $Cr_2O_3$ to $Fe_2O_3$ is approximately 1 to 5.

The aluminate and cuprammonium solutions are poured together and solution (3) is then added until the mother liquor of the reaction product just remains slightly alkaline to phenolphthalein. The precipitate obtained is filtered off, washed with water and dried. Thereupon the exchangeable alkali is replaced to a maximum extent by ammonium, a 15–20% ammonium chloride solution being caused to trickle over the base exchange body and the excess ammonium chloride being washed out after base exchange is completed.

The contact mass obtained is pulverized and coated onto iron oxide granules or pieces of unglazed porcelain, using calcium or manganese compounds as adhesives. After filling into a suitable converter a mixture of ammonia and air containing 5–7% of ammonia is passed over the contact mass at 600–800° C., good yields of oxides of nitrogen being obtained.

The contact masses which contain vanadium, for example when a vanadite or vanadyl sulphate is a component, are well suited for the oxidation of ammonia which contains impurities such as sulphur bodies, phenolic bodies and the like, as is the case for example with ammonia produced as a by-product in the distillation of coal tar or similar tars. The impurities are oxidized to products which are harmless. The contact mass may be used as a composite contact mass and the purification and ammonia oxidation may take place simultaneously. If desired the contact mass may, however, be used as an ammonia purification contact mass as when the temperatures are maintained at a lower point, for example 400–450° C., the same contact mass, or those described in the forepart of the present or in Example 1 may be used for the second stage in which the ammonia is oxidized to nitrogen oxides, this reaction of course taking place at higher temperatures.

This application is in part a continuation of my co-pending application Serial No. 171,727, filed February 28, 1927, which is now Patent No. 1,694,620, dated December 11, 1928.

What is claimed as new is:

1. A method of oxidizing ammonia to oxides of nitrogen, which comprises passing ammonia admixed with an oxygen containing gas at an elevated temperature over a contact mass containing at least one element which is catalytically active in promoting the oxidation of ammonia to nitrogen oxides containing a non-silicious base exchange body.

2. A method of oxidizing ammonia to oxides of nitrogen, which comprises passing ammonia admixed with an oxygen containing gas at an elevated temperature over a contact mass containing at least one element which is catalytically active in promoting the oxidation of ammonia to nitrogen oxides containing a diluted non-silicious base exchange body.

3. A method of oxidizing ammonia to oxides of nitrogen, which comprises passing ammonia admixed with an oxygen containing gas at an elevated temperature over a contact mass containing at least one element which is catalytically active in promoting the oxidation of ammonia to nitrogen oxides containing a non-silicious base exchange body, the catalytically active elements being chemically combined in the non-silicious base exchange body.

4. A method of oxidizing ammonia to oxides of nitrogen, which comprises passing ammonia admixed with an oxygen containing gas at an elevated temperature over a contact mass containing at least one element which is catalytically active in promoting the oxidation of ammonia to nitrogen oxides containing a non-silicious base exchange body, the catalytically active elements being chemically combined in the non-silicious base exchange body in non-exchangeable form.

5. A method of oxidizing ammonia to oxides of nitrogen, which comprises passing ammonia admixed with an oxygen containing gas at an elevated temperature over a contact mass containing at least one element which is catalytically active in promoting the oxidation of ammonia to nitrogen oxides containing a diluted non-silicious base exchange body, at least one of the diluents being catalytically active.

6. A method of oxidizing ammonia to oxides of nitrogen, which comprises passing ammonia admixed with an oxygen containing gas at an elevated temperature over a contact mass containing at least one element which is catalytically active in promoting the oxidation of ammonia to nitrogen oxides containing a non-silicious base exchange body, the contact mass containing at least one compound of an element falling within the group consisting of alkali metals, alkaline earth metals.

7. A method of oxidizing ammonia to oxides of nitrogen, which comprises passing ammonia admixed with an oxygen containing gas at an elevated temperature over a contact mass containing at least one element which is catalytically active in promoting the oxidation of ammonia to nitrogen oxides containing a non-silicious base exchange body, the contact mass containing at least one solid chemical catalyst for vapor phase catalytic reactions which catalyst is not a specific catalyst for the oxidation of ammonia to oxides of nitrogen.

8. A method of oxidizing impure ammonia containing oxidizable impurities, which comprises bringing about reaction between the ammonia and an oxygen containing gas at an elevated temperature in the presence of a contact mass containing at least one element which is catalytically active in promoting the oxidation of ammonia to nitrogen oxides containing a non-silicious base exchange body and favoring the selective oxidation of impurities.

9. A method of oxidizing impure ammonia containing oxidizable impurities, which comprises passing a mixture of the ammonia and an oxygen containing gas over a contact mass which favors the selective oxidation of the impurities but which does not favor oxidation of ammonia at the temperature used, and then passing the purified ammonia admixed with an oxygen containing gas over a contact mass favoring the oxidation of ammonia, at least one of the contact masses containing a non-silicious base exchange body.

10. A method of oxidizing impure ammonia containing oxidizable impurities, which comprises passing a mixture of the ammonia and an oxygen containing gas over a contact mass which favors the selective oxidation of the impurities but which does not favor oxidation of ammonia at the temperature used, and then passing the purified ammonia admixed with an oxygen containing gas over a contact mass favoring the oxidation of ammonia, at least one of the contact masses containing a diluted non-silicious base exchange body.

11. A method of oxidizing impure ammonia containing oxidizable impurities, which comprises passing a mixture of the ammonia and an oxygen containing gas over a contact mass which favors the selective oxidation of the impurities but which does not favor oxidation of ammonia at the temperature used, and then passing the purified ammonia admixed with an oxygen containing gas over a contact mass favoring the oxidation of ammonia, at least one of the contact masses containing a non-silicious base exchange body, at least one catalytically active component being chemically combined in the non-silicious base exchange body.

12. A method of oxidizing impure ammonia containing oxidizable impurities, which comprises passing a mixture of the ammonia and an oxygen containing gas over a contact mass which favors the selective oxidation of the impurities but which does not favor oxidation of ammonia at the temperature used, and then passing the purified ammonia admixed with an oxygen containing gas over a contact mass favoring the oxidation of ammonia at least one of the contact masses containing a non-silicious base exchange body, at least one catalytically active component being chemically combined in the non-silicious base exchange body in non-exchangeable form.

13. A method according to claim 9, in which the reaction temperature during the selective oxidation of the impurities is lower than the reaction temperature during the oxidation of the ammonia.

14. A method according to claim 9, in which both contact masses contain non-silicious base exchange bodies.

15. A method according to claim 9, in which both contact masses contain non-silicious base exchange bodies and the selective oxidation of the impurities takes place at a lower reaction temperature than the oxidation of the ammonia.

16. A method according to claim 1 in which a non-silicious base exchange body contains a metal element of the 5th and 6th groups in chemical combination.

17. A method according to claim 2 in which a non-silicious base exchange body contains a metal element of the 5th and 6th groups in chemical combination.

18. A method according to claim 3 in which a non-silicious base exchange body contains a metal element of the 5th and 6th groups in chemical combination.

19. A method according to claim 1 in which the non-silicious base exchange body contains vanadium in chemical combination.

20. A method according to claim 2 in which the non-silicious base exchange body contains vanadium in chemical combination.

21. A method according to claim 3 in which the non-silicious base exchange body contains vanadium in chemical combination.

Signed at Pittsburgh, Pennsylvania, this 12th day of April, 1928.

ALPHONS O. JAEGER.